Figure 1:
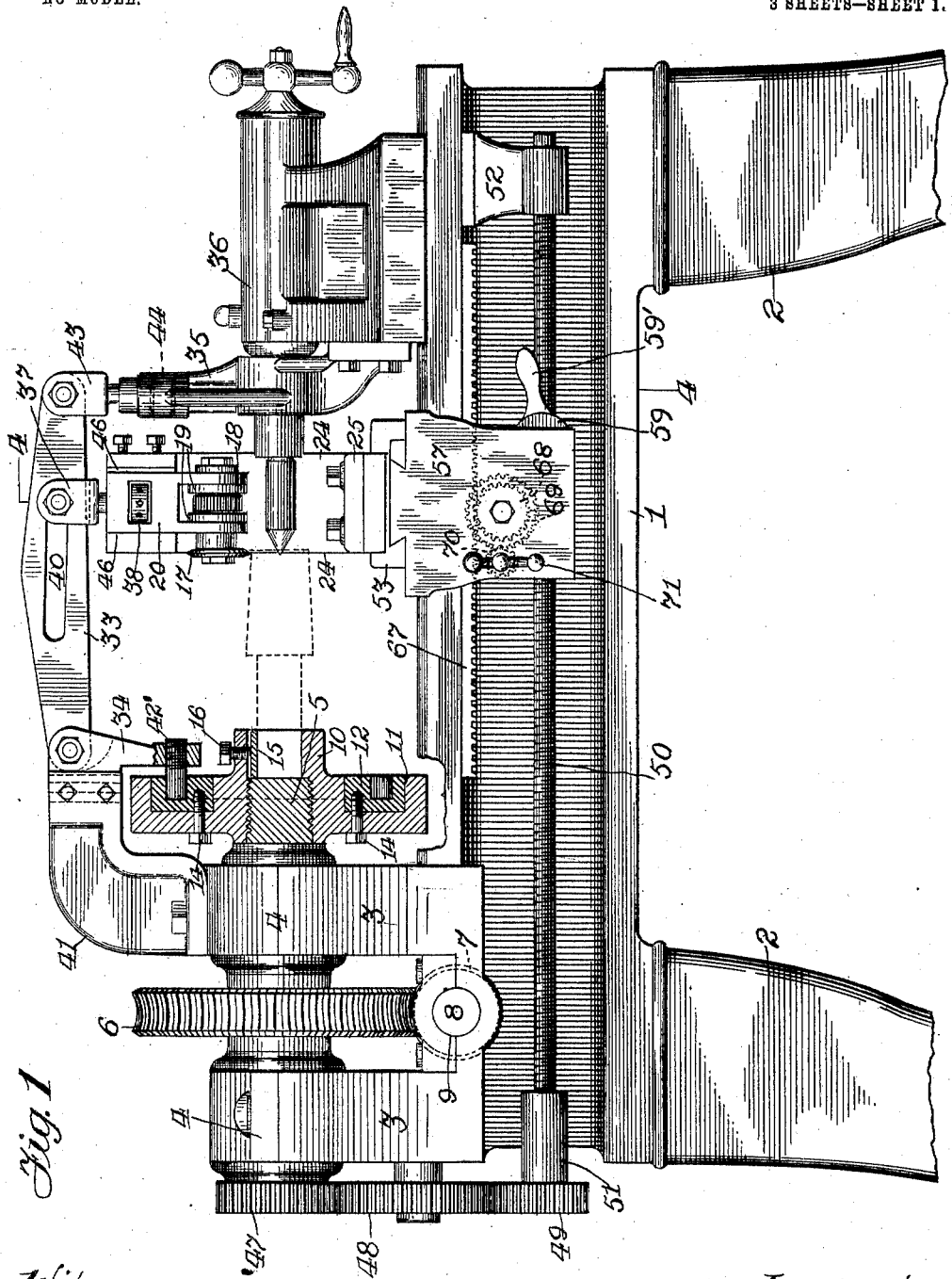

No. 760,301. PATENTED MAY 17, 1904.
C. BERRY.
MACHINE FOR FORMING TAPS, DIES, OR THE LIKE.
APPLICATION FILED JUNE 10, 1903.
NO MODEL. 3 SHEETS—SHEET 1.

Witnesses:
Geo. B. Rowley.
E. E. Potter.

Inventor,
C. Berry.
By
Attorneys.

No. 760,301. PATENTED MAY 17, 1904.
C. BERRY.
MACHINE FOR FORMING TAPS, DIES, OR THE LIKE.
APPLICATION FILED JUNE 10, 1903.
NO MODEL. 3 SHEETS—SHEET 2.
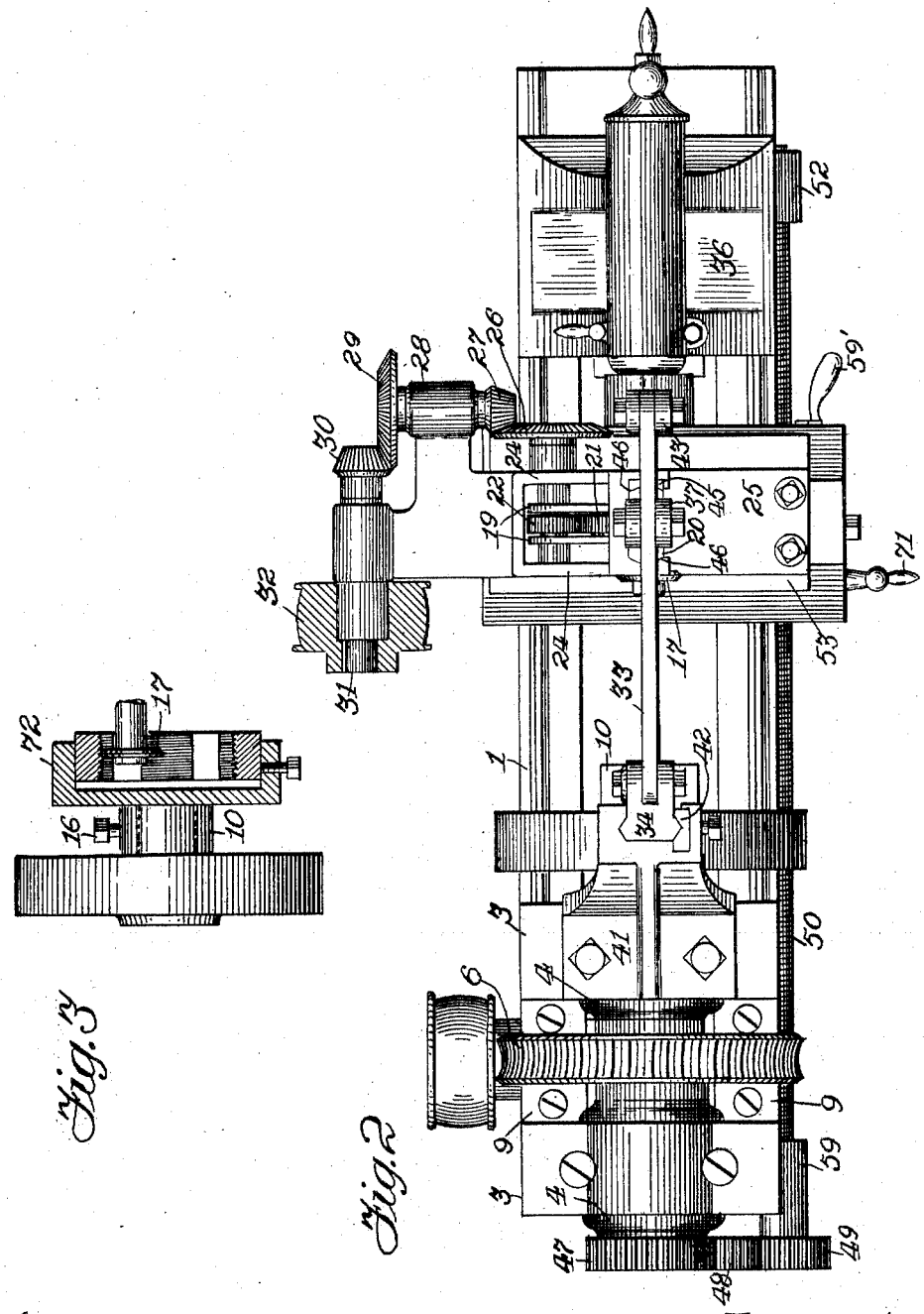
Witnesses:
Geo. B Rowley
E. E. Potter
Inventor:
C. Berry
By N. C. Evert & Co.
Attorneys.

No. 760,301. PATENTED MAY 17, 1904.
C. BERRY.
MACHINE FOR FORMING TAPS, DIES, OR THE LIKE.
APPLICATION FILED JUNE 10, 1903.
NO MODEL. 3 SHEETS—SHEET 3.
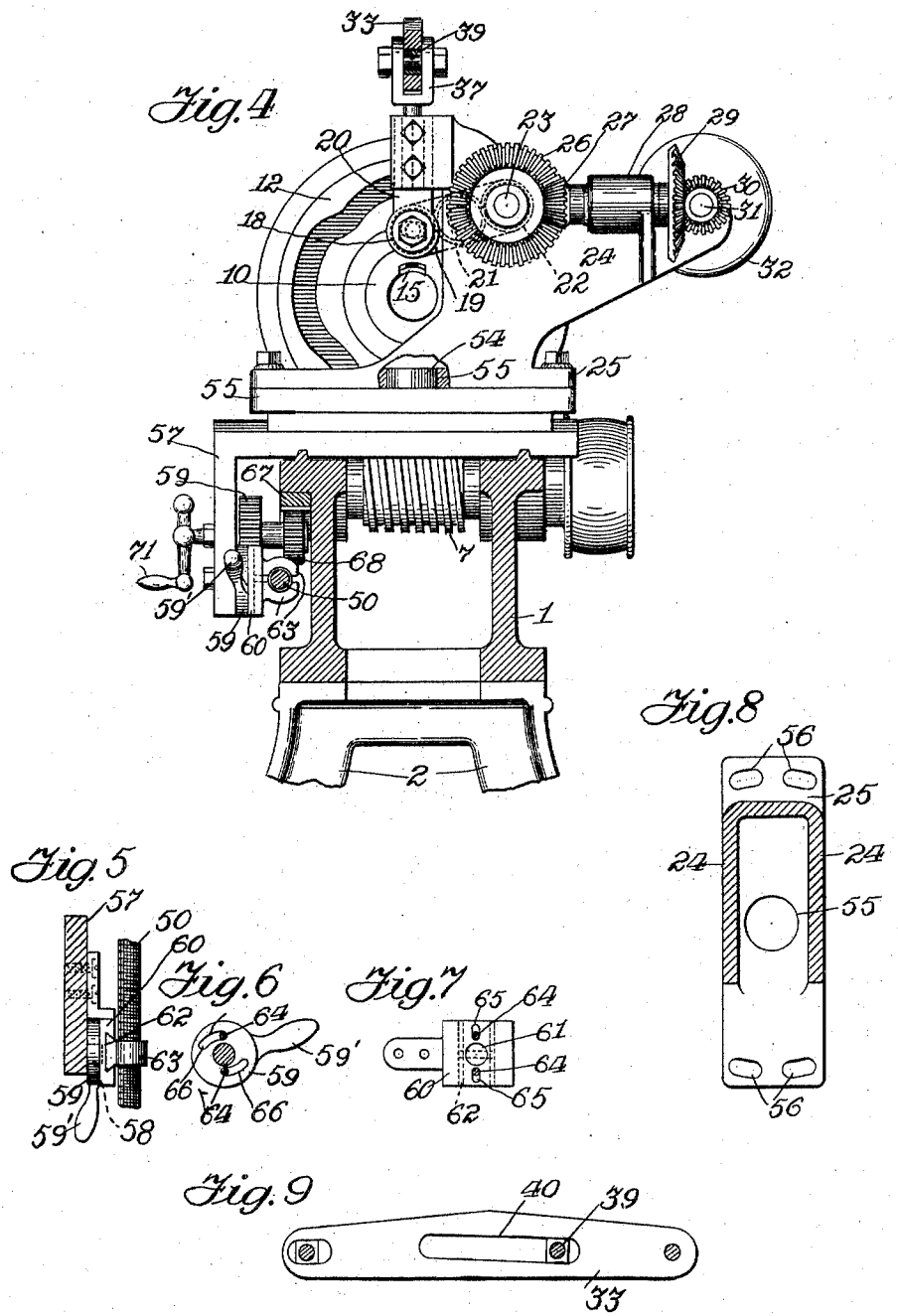
Witnesses:
Geo. B Rowley
E. E. Potter
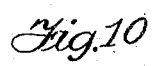
Inventor:
C. Berry
By
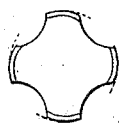
Attorneys:

No. 760,301. Patented May 17, 1904.

UNITED STATES PATENT OFFICE.

CHRISTOPHER BERRY, OF GREENSBURG, PENNSYLVANIA.

MACHINE FOR FORMING TAPS, DIES, OR THE LIKE.

SPECIFICATION forming part of Letters Patent No. 760,301, dated May 17, 1904.

Application filed June 10, 1903. Serial No. 160,837. (No model.)

*To all whom it may concern:*

Be it known that I, CHRISTOPHER BERRY, a citizen of the United States of America, residing at Greensburg, in the county of Westmoreland and State of Pennsylvania, have invented certain new and useful Improvements in Machines for Forming Taps, Dies, or the Like, of which the following is a specification, reference being had therein to the accompanying drawings.

This invention relates to certain new and useful improvements in machines for forming taps, dies, or the like, and relates more particularly to a machine wherein the entire operation of cutting the threads on taps or dies is automatically performed.

The object of this invention is to provide a machine whereby a tap or die may be cut with a great saving of expense due to the decreased time required therefor.

A further object of this invention is to provide a machine wherein the entire operation is automatic and skilled workmen are not required to operate the machine.
A further object of this invention is to provide means within the machine whereby the rear portion of the thread cut on the tap or die will be "relieved," or, in other words, of slightly less diametrical diameter than the main portion of the thread, this having been done heretofore by skilled workmen by hand.

A still further object of this invention is to provide a machine wherein the different parts are readily adjustable for the purpose of permitting the different-sized taps or dies to be cut in the same machine and at the same time to have the same rigid and accurate while operating upon any-sized tap or die.

In describing the invention in detail reference is had to the accompanying drawings, forming a part of this specification, and wherein like numerals of reference indicate like parts throughout the several views, in which—

Figure 1 is a side elevation of my improved machine, a portion thereof being shown in section. Fig. 2 is a plan view of the same, a portion thereof being shown in section. Fig. 3 is a partial side elevation showing the machine as adapted to cut a die. Fig. 4 is a sectional elevation taken on the line 4 4 of Fig. 1. Fig. 5 is a sectional plan view of the feed mechanism. Fig. 6 is an end elevation of the feed-lever. Fig. 7 is an elevation of the slide in which the feed-clutch operates. Fig. 8 is a sectional plan view of the adjustable table upon which the milling-cutter mechanism is placed. Fig. 9 is a side elevation of the milling-cutter-actuating lever. Fig. 10 is an end elevation of the tap, showing the relieved portion of the thread formed by my improved machine.

Briefly described, my invention consists in providing a milling-cutter the cutting edge of which corresponds with the angle of the thread, the said milling-cutter being rotatably mounted in a reciprocating carriage, the movement of which is controlled by the cam located on or adjacent to the tap or die holder. The tap or die holder and cam are driven by means of a worm and worm-gear, and a train of changeable gears connected therewith lead to the feed-screw by which the milling-cutter is fed over the work. The rotation of the said milling-cutter is accomplished through the separate driving mechanism, whereby the speed of the same is not dependent upon the speed of rotation of the tap or die. I also provide means whereby the feed-screw may be readily disconnected from the milling-cutter, whereby when the same has been fed over the tap or die the milling-cutter may be readily restored to its initial position.

The reference-numeral 1 indicates the bed of the machine, upon which the different parts are mounted, and suitable legs 2 2 support said bed in the usual manner.

In carrying out my invention I have so designed the different parts that they may be readily applied to any lathe-bed.

Located at one end of the machine are uprights 3 3, in which the bearings 4 4 are formed. A shaft 5, passing through said bearings, has between the supports 3, keyed or otherwise fastened thereon, the worm-gear 6, which meshes with and is rotated by the worm 7, which is mounted on the shaft 8, journaled in bearings 9 9, formed between said supports 3. The forward end of this shaft 5 is screw-threaded, and mounted thereon is a chuck 10, in which a recess 11 is formed, and a cam member 12 is seated within said recess and secured therein by screws 14. The forward end of this chuck is provided with a gib 15, which may be secured in position by a set-screw 16, and in the case of taps the shank thereon is inserted within said chuck and held therein by the said gib.

The milling-cutter 17 is secured to the shaft upon which the gear 18 is secured, and said gear operates between two gear-supporting links 19 19, the shaft upon which said gear is mounted being inserted through a suitable aperture formed in said links and also through apertures formed through an extension of the carriage 20. The gear 18 meshes with a gear 21, also pivotally mounted within the links, and the said gear 21 meshes with a gear 22, which is secured upon the shaft 23, extending through said links and also through the vertical sides 24 of the adjustable mill-table 25. It will thus be seen that the gears 18, 21, and 22 will always be maintained in mesh and that the links 19 are fulcrumed on the shaft 23, the forward ends of said links operating in a slot formed within the extensions of the carriage 20. Thus the vertical movement of said carriage will impart a similar movement to the milling-cutter; but the same will always be positively driven by this train of gears through the medium of the beveled gear 26, secured to the shaft 23. This beveled gear 26 is driven by a beveled gear 27, mounted upon the shaft, which has a bearing in the box 28, and the said shaft is connected on the other end thereof to a beveled gear 29, which is driven by the beveled gear 30, secured to the shaft 31, on which the driving-pulley 32 is secured. This driving-pulley 32 is driven by a belt which is suitably connected to the counter-shaft, and it will thus be seen that the rotation of the milling-cutter will be imparted by this train of gears in whatever position the milling-cutter may be. The carriage 20 is connected with the cam 12 through the lever 33 and slide 34, and the said lever is fulcrumed at its outer end to the bracket 35, secured to the tail-stock 36 of the machine. The carriage 20 is connected with said lever by a clevis 37, the relation of said carriage to the clevis being adjustable by the nut 38, as will be clearly seen by reference to Fig. 1. This clevis has a bolt which passes through the squared plug 39, which is adapted to slide within the upwardly-inclined slot 40, formed in the central portion of said lever 33, and the forward end of the lever is connected with the slide 34 by a similar connection, as seen by referring to Fig. 9. When the inclination of slot 40 is the same as the taper of the tap, the relief portion of the rear end of the tap will be greater than at the front end thereof, due to the increased downward throw of the milling-cutter as the latter leaves the point of fulcrum of the lever to which the milling-cutter is connected. This increased relief portion at the larger ends of the taps is necessary in taps employed especially for threading pipe-fittings. It will be noted, however, that by increasing the inclination of the slot 70 with respect to the longitudinal axis of the tap the degree of relief imparted the tap at the rear may be decreased. The said slide 34 is adapted to operate vertically in ways formed in the bracket 41, which is secured to one of the uprights 3, and a gib 42 is provided in the side of said ways for the purpose of taking up wear. The lower end of the slide 34 has screw-threaded therein a pin 42', the one end of which engages and is actuated by the cam-slot formed in the cam 12. The rear end of the lever 33 is fulcrumed to the clevis 43, which may be adjusted by a nut 44, mounted in the bracket 35, before described, and the elevation of this pivotal point will determine the angle upon which the said milling-cutter will travel when traversing the work, this being for the purpose of varying the taper upon which the tap or die is cut. It will be seen that the angle of the slot 40 would vary with the adjustment of this pivotal point, as the front end of said lever is at a given elevation due to the slide being actuated by the fixed cam. A gib 45 is provided in the ways 46, formed in the table-head, the carriage 20 operating within these ways. The rate of speed with which the milling-cutter is fed over the work will determine the pitch of the thread which is being cut thereon, and this feed is accomplished by means of the gears 47, mounted on the driving-shaft, upon which the worm-gear 6 is mounted, the intermediate gear 48, pivoted on a boss formed on the upright 3, and a gear 49, secured to the end of the feed-shaft 50, which is mounted in brackets 51 52, secured to the bed of the lathe. This feed-screw is connected with the carriage of the lathe, which will be hereinafter more fully described, and the said carriage has mounted on its upper side the part 53, upon which the table of the milling-cutter is secured. It will thus be seen that the feeding of the carriage will also feed the milling-cutter, thereby causing it to traverse the work.

The part 53, upon which the table is mounted, is provided at a point central of the same with a boss 54, which may be seen in Fig. 4, the said boss extending through an aperture 55, formed in said table, and the outer ends of the table have provided therein elongated slots 56, through which set-screws pass, and are threaded into the part 53. By loosening these screws the table and all of the milling-cutter-operating mechanism will be moved to different angular positions, thereby permitting the milling-cutter to smoothly and accurately cut a thread of any pitch.

The connections between the feed-screw and the carriage will now be described.

Formed upon the inner side of the apron 57 of the carriage is a boss 58, over which the cam portion 59 of the feed-lever 59' is placed, and a bracket 60 has a recess 61 also fitting over this boss, said bracket being secured to said apron by screws or other suitable means. Formed in one side of this bracket is a dovetailed slot 62, in which the clutch members 63 63 are adapted to operate, and these clutch members have pins or projections 64, which extend through slots 65 and into slots 66, formed in the cam portion 59 of the feed-lever 59'. It will thus be seen that the partial rotation of the feed-lever and the cam portion formed thereon will actuate the pins or projections 64, secured to the clutch members, and that the same will be either engaged or disengaged from the feed-shaft 50. In order that when the carriage has been disengaged from the feed-shaft the same may be returned to any position, I provide a rack 67 on the bed of the lathe, and a gear 68 meshes therewith, said gear being connected to a gear 69, with which the gear 70, having the operating-handle 71 secured thereto, meshes. Thus the rotation of said handle will impart movement to this train of gears, thus moving the carriage.

When it is desired to use this machine for cutting dies, an auxiliary chuck 72 is mounted within the regular chuck and the die secured therein, as will be seen by Fig. 3, and in this case it will be necessary to mount the milling-cutter upon a somewhat longer shaft than would be the case in cutting taps.

By virtue of the connection aforedescribed between the means for mounting the milling-cutter and the said lever 33, the latter having its movements in a vertical plane controlled by said work-holding chuck, the said cam will cause said lever, and consequently the milling-cutter, to be depressed successively during the revolutions of the work-holding chuck. As is obvious from Fig. 10 of the drawings, the tap therein illustrated has its threaded portions between the grooves thereof provided with four relieved portions, which are formed by the corresponding depressed portions of the cam, which are four in number, such depressed portions of the cam being timed to cause the milling-tool to be depressed adjacent the termination of the threaded portions, as illustrated in dotted lines in Fig. 10.

While I have herein shown and described my invention in detail, it will be observed that various changes may be made in the details of construction of the driving means, &c., without departing from the general spirit of my invention.

Having fully described my invention, what I claim as new, and desire to secure by Letters Patent, is—

1. In a machine of the type set forth, the combination of the bed, the head-stock, and tail-stock, and the carriage operated from said head-stock, of a work-holding chuck secured to the shaft of the head-stock, a milling-cutter mounted on the carriage, means for mounting said cutter, whereby the same is movable in a vertical plane, a lever receiving sliding support from the head-stock and pivotally connected to the tail-stock, said lever having movement in a vertical plane, a connection between said lever and said mounting means of the milling-cutter, means for rotating said milling-cutter, and means operated by said work-holding chuck and connected to said lever for causing the latter to be successively depressed a number of times during the revolution of said work-holding chuck.

2. In a machine of the type set forth, the combination with the bed, the head-stock, and the tail-stock, the reciprocating carriage and the feed-screw thereof operated from the said head-stock spindle, of a work-holding chuck secured to the spindle of the head-stock, a milling-cutter, with means for mounting said milling-cutter on the carriage, and means for actuating said milling-cutter, a lever receiving sliding support from the head-stock and pivoted to the tail-stock, a connection between said lever and said milling-cutter mounting, and means operated from the head-stock spindle for successively depressing said lever a number of times during a single revolution of the work-holding chuck.

3. In a machine of the type set forth, the combination with the bed, the head-stock, a work-holding chuck therein, the tail-stock, the carriage and the feed-screw thereof, of a milling-cutter, with means for mounting said milling-cutter on the carriage to provide a vertical movement therefor, a lever pivotally supported from the tail-stock, and receiving sliding support from the head-stock to have movement vertically, means actuated by the work-holding chuck for depressing said lever successively a number of times during a single revolution of said chuck, and a connection between said mounting of the milling-cutter and said lever, said connection moving with the carriage, and means whereby the connection during the carriage movement raises said milling-cutter upwardly.

4. In a device of the type set forth, the combination with the bed, the head-stock, the work-holding chuck thereof, a tail-stock, the carriage and the feed-screw thereof, of a milling-cutter carried by the carriage and having upward movement, a lever pivotally supported by the tail-stock, and receiving sliding support from the head-stock so as to be capable of vertical movement with respect thereto, a connection between the milling-cutter and lever, means for controlling the milling-cutter during the forward movement of said carriage, a cam carried by the work-holding chuck, and a connection between said cam and the forward end of the lever, to successively depress said lever a number of times during a single revolution of the chuck, and means for driving said cutter.

5. In a machine of the type set forth, the combination with the bed, the head-stock, and work-holding chuck thereof, the tail-stock, the carriage and the feed-screw thereof, of a milling-cutter with means for driving the same, said milling-cutter being supported by the carriage and being capable of vertical movement, means operated from the head-stock and pivotally connected to the tail-stock for successively depressing said milling-cutter a number of times during each revolution of said work-holding chuck, and means on said means for controlling said milling-cutter during the forward movement of the carriage.

6. In a machine for cutting taps or dies, the combination of a milling-cutter, links in which a bearing for said milling-cutter is formed, a gear located between said links and secured to said milling-cutter, a shaft upon which the rear ends of said links are pivotally mounted, a gear secured to said shaft, a gear interposed between said gears and mounted in said links, beveled geared connections between the shaft upon which the second-mentioned gear is mounted and the drive-pulley whereby rotary movement is imparted to the milling-cutter, a reciprocatory carriage, the extensions of said carriage supporting the outer ends of said links, a lever for actuating said carriage, adjustable connections between said lever and carriage, adjustable connections between the rear end of said lever and the milling-cutter, a slide connected to the forward end of said lever, a projection from the said slide, a cam in which said projection is adapted to operate, a shaft upon which said cam is mounted, a gear for driving said shaft, a work-holding chuck secured to said shaft, a feed-screw located adjacent to the lathe, gear connections between said driving-gear and said feed-screw, a table upon which the drive mechanism for the milling-cutter is secured, a carriage upon which said table is adjustably secured, detachable connections between said feed-screw and said carriage whereby the same may be disengaged, and means for actuating said carriage when said detachable means are in their inoperative position, substantially as described.

7. In a machine of the type set forth the combination with the bed, the head-stock, the work-holding chuck thereof, a tail-stock, a carriage, and the feed-screw thereof, of a milling-cutter, means for supporting said milling-cutter from the carriage so as to be capable of a vertical movement, a lever having pivotal connection with the tail-stock and receiving sliding support from the head-stock so as to have a vertical movement, a cam on the work-holding chuck, and means engaging said cam and connected to said lever for successively depressing the latter a number of times during each revolution of the work-holding chuck, and a connection between said milling-cutter and said lever whereby the latter is controlled during the forward movement of the carriage.

8. In a machine of the type set forth, the combination with the bed, the head-stock, the work-holding chuck thereof, the tail-stock, the carriage and the feed-screw thereof, of a cam carried by the work-holding chuck, a lever having pivotal connection with the tail-stock and vertically movable with relation to the head-stock, said lever having a slide connected thereto, said slide engaging and actuated by said cam, a milling-cutter with means for operating the same, said lever having an inclined slot therein, means for mounting said milling-cutter so as to permit the latter to have a vertical movement, and a connection between said milling-cutter and said lever, said connection extending through the slot of the latter, and elevating said milling-cutter during the forward movement of the carriage and depressing said milling-cutter a number of times during each revolution of the cam.

In testimony whereof I affix my signature in the presence of two witnesses.

CHRISTOPHER BERRY.

Witnesses:
FREEMAN ROCKHAVER,
EARLY EDWARDS.